United States Patent
Back et al.

(10) Patent No.: US 11,348,264 B1
(45) Date of Patent: May 31, 2022

(54) CAPTURING CONTENT ON WRITING SURFACES USING DEPTH AND IMAGE SENSING

(71) Applicant: Meta Platforms, Inc., Menlo Park, CA (US)

(72) Inventors: Tyler Back, San Francisco, CA (US); Gabriel Molina, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 2 days.

(21) Appl. No.: 16/856,779

(22) Filed: Apr. 23, 2020

(51) Int. Cl.
  *G06K 9/00* (2022.01)
  *G06T 7/543* (2017.01)
  *G06T 7/194* (2017.01)
  *G06T 7/571* (2017.01)
  *G06V 30/32* (2022.01)

(52) U.S. Cl.
  CPC ............ *G06T 7/543* (2017.01); *G06T 7/194* (2017.01); *G06T 7/571* (2017.01); *G06V 30/347* (2022.01); *G06V 30/387* (2022.01)

(58) Field of Classification Search
  CPC .......... H04L 67/22; H04N 7/147; H04N 7/15; H04N 5/232; H04N 21/42204; G06K 2209/01; G06K 9/00711; G06K 9/0061; G06K 9/00624; G06K 9/344; G09B 5/065; G09B 5/02; G09B 5/10; G09B 5/08; G09B 5/14
  See application file for complete search history.

(56) References Cited

U.S. PATENT DOCUMENTS

| | | | | |
|---|---|---|---|---|
| 5,025,314 A | * | 6/1991 | Tang | G06F 3/0425 178/18.11 |
| 8,542,252 B2 | * | 9/2013 | Perez | G06K 9/00201 345/649 |
| 8,881,231 B2 | * | 11/2014 | Barrus | G06F 21/31 726/2 |
| 9,336,607 B1 | * | 5/2016 | Chang | G06T 7/73 |
| 9,413,784 B2 | * | 8/2016 | Kohno | G06F 21/6245 |
| 10,909,761 B1 | * | 2/2021 | Reid | G06T 19/006 |
| 2004/0165786 A1 | * | 8/2004 | Zhang | H04N 1/387 382/276 |
| 2005/0104864 A1 | * | 5/2005 | Zhang | G06T 7/20 345/173 |
| 2005/0210105 A1 | * | 9/2005 | Hirata | G06F 16/7834 709/205 |

(Continued)

*Primary Examiner* — Shervin K Nakhjavan
(74) *Attorney, Agent, or Firm* — Fenwick & West LLP

(57) ABSTRACT

A communication system captures writing surface content in a physical space for transmittal to remote client devices participating in a communication session. During a communication session with one or more remote client devices, a communication system captures image data and depth data describing objects in a physical space of the communication system. Based on the captured data, the communication system identifies a writing surface in the physical space and captures content on the writing surface. The communication system may also identify objects occluding content on the writing surface based on the captured data and may modify image data to make an object occluding the content at least partially transparent. The communication system transmits the content to at least one of the remote client devices participating in the communication session.

19 Claims, 5 Drawing Sheets

(56) References Cited

U.S. PATENT DOCUMENTS

| | | | | |
|---|---|---|---|---|
| 2015/0009278 A1* | 1/2015 | Modai | ............ | H04N 7/15 |
| | | | | 348/14.08 |
| 2017/0228940 A1* | 8/2017 | Kutliroff | ............ | G06T 7/12 |
| 2017/0372449 A1* | 12/2017 | Yarvis | ............ | G06T 7/12 |
| 2019/0033991 A1* | 1/2019 | Shirai | ............ | G06F 3/03545 |
| 2019/0099681 A1* | 4/2019 | Rico | ............ | B25J 15/10 |
| 2019/0341050 A1* | 11/2019 | Diamant | ............ | H04N 7/155 |
| 2020/0035035 A1* | 1/2020 | Rainisto | ............ | G06F 3/012 |
| 2021/0076105 A1* | 3/2021 | Parmar | ............ | H04N 21/234336 |

* cited by examiner

CAPTURING CONTENT ON WRITING SURFACES USING DEPTH AND IMAGE SENSING

BACKGROUND

Virtual communication sessions are a common method for simulating in-person meetings or conferences when one or more users are remote from a physical location. While virtual communication sessions allow remote users to view and interact with other users in real-time, however, a number of problems arise during virtual communication sessions. For example when physical objects such as whiteboards, blackboards, or other writing surfaces, remote users may be limited in their ability to access, view, or interact with content or items on the writing surfaces.

SUMMARY

This disclosure relates generally to sharing content during communication sessions, and more particularly to detecting and capturing writing surface content in a physical space during virtual communication sessions.

A communication system communicatively coupled to one or more remote client devices uses depth sensors to detect writing surfaces in a physical space and to capture content on the writing surface during virtual communication sessions. During a virtual communication session, the communication system captures images of a physical space of the meeting using a camera. The communication system uses a depth sensor to capture depth data associated with objects in the physical space and processes the images and depth data to detect flat surfaces within the physical space. The communication system determines whether a respective surface of the flat surfaces meets one or more criteria (also referred to herein as "surface criteria," "whiteboard-mode triggering criteria," "predefined surface criteria," and "writing surface criteria") associated with a writing surface. In some embodiments, the one or more criteria includes a color threshold for the respective surface, a size threshold for the respective surface, and/or a shape requirement for the respective surface. As such, as an example, the respective surface can meet (or otherwise satisfy) the predefined criteria when the respective surface is white in color (or some other color defined by the predefined criteria). In doing so, the respective surface can be identified as a writing surface such as a whiteboard, blackboard, notepad, or the like. It is also noted that the one or more criteria may also be predefined (e.g., stored in the device's memory).

Responsive to the determination, the communication system captures content written on the writing surface. For example, the communication system uses the camera to capture image data including content on the writing surface. The communication system transmits the captured content to at least one remote client device for display, such that a user of the remote client device is able to view content on the writing surface.

In one embodiment, the communication system additionally stores information identifying a region of the physical space corresponding to the writing surface. For example, the information includes a plane of the writing surface and boundaries of the plane. The communication system receives updated or current image frames from the camera. The communication system detects when an object obscures all or part of the writing surface based on depth information from the depth sensor based on the current image frame. For example, the communication system determines that an object is within the boundaries of the plane and has a depth between the camera and the plane. In order to ensure that users of remote client devices in the virtual communication session are able to view content on the writing surface despite the object, the communication system processes the current image frame to render the object at least partially transparent and transmits the processed image frame to the remote client devices.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
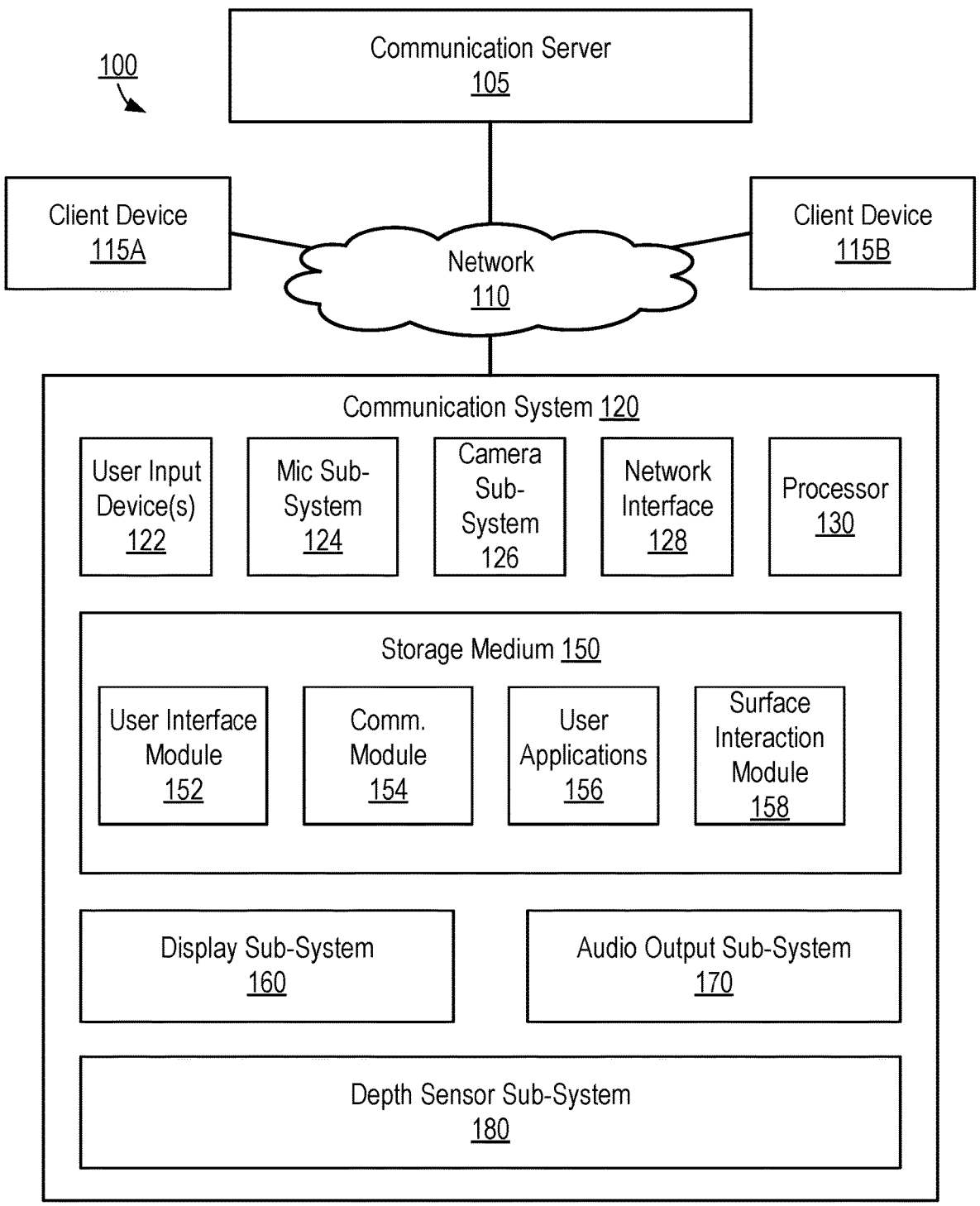
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, an audio sub-system 170, and a depth sensor sub-system 180. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 120 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 120 may output audio in multiple channels to generate beamformed audio signals that give the listener a sense of directionality associated with the audio. For example, the audio output sub-system may generate audio output as a stereo audio output or a multi-channel audio output such as 2.1, 3.1, 5.1, 7.1, or other standard configuration.

The depth sensor sub-system 180 comprises one or more depth sensors or an interface for coupling to one or more external depth sensors that detect depths of objects in physical spaces surrounding the communication system 120. In an embodiment, the depth sensor sub-system 180 is a part of the camera sub-system 126 or receives information gathered from the camera sub-system to evaluate depths of objects in physical spaces. In another embodiment, the depth sensor sub-system 180 includes one or more sensors integrated with other components of the communication system 120. Alternatively, the depth sensor sub-system 180 comprises an interface (e.g., an HDMI port) for coupling the communication system 120 with one or more external depth sensors.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, surface interaction module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and surface interaction module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The surface interaction module 158 detects and captures writing surface content in physical spaces during virtual communication sessions. The surface interaction module 158 receives data from the camera sub-system 126 and the depth sensor sub-system 180 to detect writing surfaces in physical spaces during communication sessions. Based on the received data, the surface interaction module 158 detects one or more writing surfaces in the physical space and captures data displayed on the writing surface. The captured data is transmitted to one or more client devices 115 remote from the physical space, such that remote users are able to view writing surface content in real-time during virtual communication sessions.

In some embodiments, the surface interaction module 158 may detect and capture content on any surface of interest having written, drawn, or typed content in a physical space during a virtual communication session. For example, the surface interaction module 158 may detect and capture content on whiteboards, blackboards, canvas, notepads, notebooks, transparent or semi-transparent glass being used as a writable surface, and the like.

Figure 2:
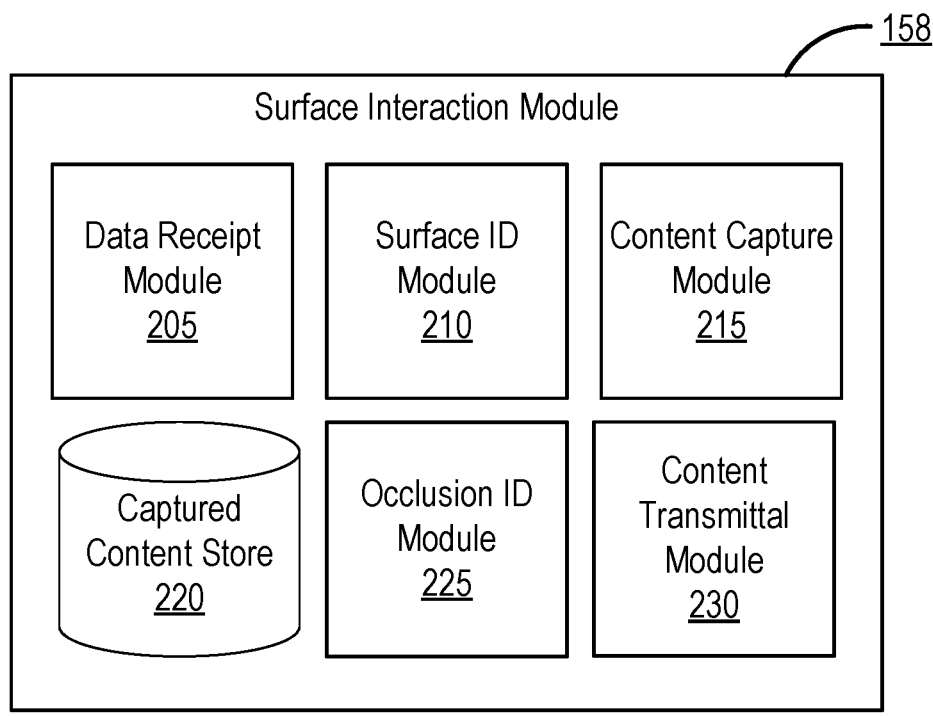
FIG. 2 is a block diagram of an architecture for a surface interaction module, in accordance with an embodiment.

FIG. 2 is a block diagram of an architecture for a surface interaction module, in accordance with an embodiment. The surface interaction module 158 shown in FIG. 2 includes a data receipt module 205, a surface ID module 210, a content capture module 215, a captured content store 220, an occlusion ID module 225, and a content transmittal module 230. In other embodiments, the surface interaction module 158 may include additional, fewer, or different components for various applications.

The data receipt module 205 communicates with one or more sub-systems of the communication system 120 to receive information describing communications and environmental data. For example, the data receipt module 205 communicates with the communication module 154 to determine when a communication session between the communication system 120 and one or more remote client devices 115 is established. The data receipt module 205 additionally communicates with the camera sub-system 126 to receive image data taken by one or more cameras of the communication system 120. The image data may be, for example, image data captured of a physical space of the communication system 120.

The data receipt module 205 additionally communicates with the depth sensor sub-system 180 to receive depth data describing depths of objects in a physical space of the communication system 120. The data may include, for example, planes of flat surfaces in the physical space, distances between the communication system 120 and an object, and the like.

The surface ID module 210 detects writing surfaces in a physical space of the communication system 120 based on data received by the data receipt module 205. The surface ID module 210 identifies one or more flat surfaces in a physical space of the communication system 120 based on the depth data. For example, the surface ID module 210 identifies depth data corresponding to a plane in physical space. In some embodiments, a plane must be greater than a threshold area to be identified as a flat surface. In some embodiments, a plane must have defined bounds in physical space.

Responsive to identifying one or more flat surfaces, the surface ID module 210 accesses image data including the identified flat surfaces and evaluates the image data to identify one or more features of the identified flat surfaces. The identified features are compared to one or more predefined features of writing surfaces. In an embodiment, the surface ID module 210 applies one or more computer vision techniques to compare the image and depth data corresponding to the flat surfaces to one or more predefined criteria for a writing surface. For example, the surface ID module 210 uses neural networks trained on image data to recognize writing surfaces or features of writing surfaces, object recognition algorithms, color statistics, or other techniques. In an embodiment, the criteria may include a color threshold for the flat surface (e.g., that more than 90% of the flat surface is within a threshold value of white (or some other suitable color) to be identified as a whiteboard); a size threshold for the flat surface (e.g., that the flat surface is less than 5 feet in length or height); a shape requirement for the flat surface (e.g., that the flat surface is rectangular or approximately rectangular); or other criteria corresponding to a flat surface being a writing surface. For example, a flat surface is identified as a whiteboard when it is predominantly white, rectangular, and less than 5 feet across. In another example, a flat surface is identified as a blackboard when it is predominantly black, rectangular, and less than 5 feet in height.

In other embodiments, users of the communication system 120 are able to manually identify criteria for writing surfaces, or may manually identify a flat surface in the physical space as being a writing surface. For example, if a physical space includes a writing surface that does not fit predefined criteria set by the communication system 120, a user may indicate a boundary of a writing surface via a user input device 122 for the communication session. In another example, the user may modify criteria used by the surface ID module 210 in identifying writing surfaces.

In an embodiment, the surface ID module 210 determines or defines one or more physical boundaries and characteristics of the writing surface. For example, the surface ID module 210 identifies a plane of the writing surface in the physical space (e.g., the angle, orientation, etc. as determined by the image and depth data). In another example, the surface ID module 210 identifies boundaries of the writing surface (e.g., points in space representing corners of the writing surface, lines in space representing the sides of the writing surface, etc.).

The content capture module 215, responsive to the surface ID module 210 detecting a writing surface in a physical space, captures content on the writing surface. In an embodiment, the content capture module 215 transmits an instruction to the camera sub-system 126 to capture image data including the writing surface and isolates a portion of the image data corresponding to the writing surface. The content capture module 215 stores the portion of image data in association with the writing surface as captured writing surface content. In some embodiments, the capture content module 215 may capture content on the writing surface in real-time (e.g., as a continuous video stream via the camera sub-system 126). In other embodiments, the capture content module 215 may capture content on the writing surface at time intervals. For example, the capture content module 215 captures content on the writing surface at 1, 5, or 10 second intervals, or captures content on the writing surface responsive to a trigger event, such as an input from a user of the communication system 120.

The content capture module 215 may additionally perform one or more processing steps on the image data corresponding to the writing surface. For example, in one embodiment, the content capture module 215 may apply a processing step to crop out portions of the image data identified as being blank. In another embodiment, the content capture module 215 may apply a processing step to adjust the saturation, color, or resolution of the image data to clarify the captured content on the writing surface. In another embodiment, the content capture module 215 may apply a processing step to convert the image data of the captured content to text data. For example, the content capture module 215 processes the image data to extract a handwritten agenda and converts the handwritten agenda to text representative of the handwritten agenda.

In other embodiments, the content capture module 215 identifies symbols in captured content on the writing surface that correspond to actions taken by the communication system 120. The content capture module 215 may perform the action to modify captured content or may transmit the action to the communication system 120 to be performed. For example, the content capture module 215 may modify the captured content to bold, highlight, underline, italicize, or otherwise emphasize at least a portion of text data representing the captured content. In another example, the content capture module 215 may modify the captured content to render at least a portion of the captured content as a hotlink or a URL. In another example, the content capture module 215 may tag or notify a user in association with the communication session or with a portion of the captured content. In another example, the content capture module 215 may transmit at least a portion of the captured content to a user that was not previously receiving the captured content. In another example, the content capture module 215 may add an effect to the captured content, such as an animation, video, image, emoji, and the like. In other examples, other actions may be performed.

The content capture module 215 stores the captured content of the writing surface to the captured content store 220.

The captured content store 220 stores and maintains data describing content on writing surfaces in the physical space of the communication system 120. The stored data may be one or more of: image data, text data, video data, and the like. In some embodiments, the stored data is maintained for a specified time interval (e.g., 10 minutes, 1 hour) or for a duration of the communication session.

The occlusion ID module 225 detects objects blocking a view of a detected writing surface in current image data. The occlusion ID module 225 receives image data from the camera sub-system 126. The occlusion ID module 225 additionally receives depth data from the depth sensor sub-system 180. In some embodiments, the occlusion ID module 225 may receive the image and depth data at specified time intervals (e.g., 1, 5, or 10 second intervals). In other embodiments, the occlusion ID module 225 may receive a continuous stream of image and depth data during a communication session between the communication system 120 and one or more remote client devices 115.

The occlusion ID module 225 determines, based on a received image frame and corresponding depth data, when an object in the image frame has a depth between the three-dimensional location of the identified writing surface and the location of the communication system 120 and is within the boundaries of the plane associated with the identified writing surface, and identifies such an object as occluding the view of the writing surface. In other embodiments, the occlusion ID module 225 may consider other information when identifying an occluding object, such as based on manual input by a user of the communication system 120.

The occlusion ID module 225 may process the received image frame including the occluding object to render the occluding object at least partially transparent. The occlusion ID module 225 identifies a region of the writing surface occluded by the occluding object. The occlusion ID module 225 accesses the captured content store 220 and retrieves one or more image frames prior to the occluding object being identified. For example, the one or more image frames may be an image frame immediately prior to the occluding object being identified. In another example, the one or more image frames may be a filtered output of several image frames prior to the occluding object being identified. The occlusion ID module 225 identifies a set of pixels of the previous image frames corresponding to the region of the writing surface occluded by the occluding object in the current received image frame. In an embodiment, the occlusion ID module 225 blends the set of pixels of the previous image frames with a set of pixels of the current image frame corresponding to the occluding object, such that the occluding object is rendered partially transparent in the modified image frame. In another embodiment, the occlusion ID module 225 replaces the set of pixels in the current image frame corresponding to the occluding object with the set of pixels from the previous image frames, such that the occluding object is removed or fully transparent in the modified image frame.

The occlusion ID module 225 transmits the modified image frame to the content transmittal module 230 for display to users of the remote client devices 115 participating in the communication session.

The content transmittal module 230 controls transmittal of writing surface content to one or more remote client devices 115 during communication sessions. Responsive to receiving a current image frame, the content transmittal module 230 identifies one or more remote client devices 115 participating in the communication session with the communication system 120 and requesting writing surface content. The content transmittal module 230 may cause transmittal of video data including at least a portion of the writing surface in real-time, or may cause transmittal of image frames including at least a portion of the writing surface at specified time intervals (e.g., 1, 5, or 10 seconds). In other embodiments, the content transmittal module 230 generates a document including the captured content, such as a PDF or a document including text representative of the captured content on the writing surface, and causes transmittal of the generated document to the one or more remote client devices 115.

Figure 3A:
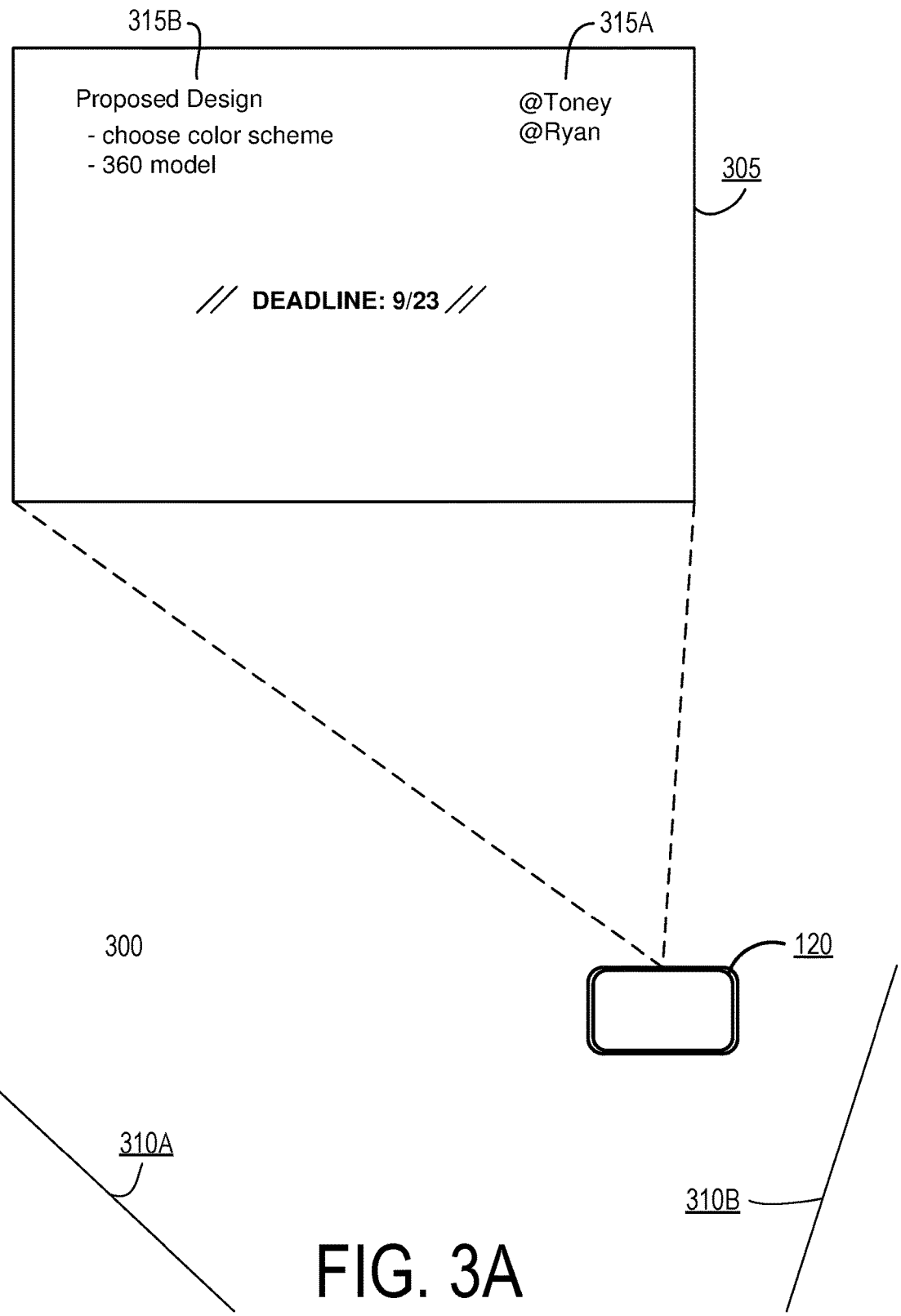
FIG. 3A is an example for detecting a writing surface in a physical space and capturing content on the writing surface, in accordance with an embodiment.
Figure 3B:
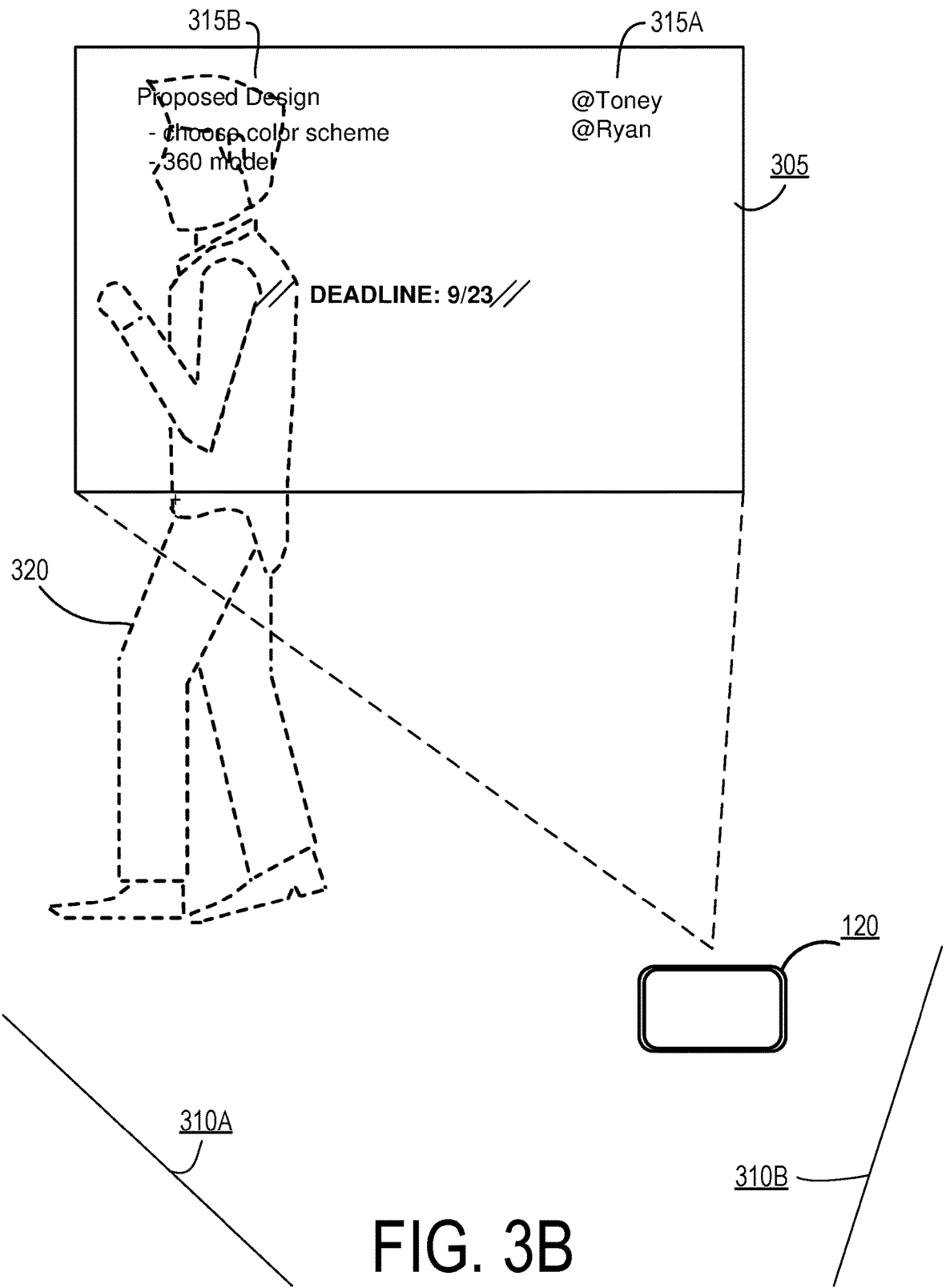
FIG. 3B is an example for detecting an occlusion impacting visibility of writing surface content and modifying image data responsive to the detection, in accordance with an embodiment.

FIGS. 3A-3B are examples for capturing content on writing surfaces in a physical space, in accordance with an embodiment. In other examples, other or additional objects may exist in the physical space, such as people, furniture, architectural elements of the physical space, and the like.

FIG. 3A is an example for detecting a writing surface in a physical space and capturing content on the writing surface, in accordance with an embodiment. A communication system 120 in a physical space 300. The physical space includes a writing surface 305. In the example of FIG. 3A, the physical space additionally includes one or more flat surfaces 310, such as walls, cabinets, and the like. The communication system 120 establishes a communication session with one or more remote client devices 115. During the communication session, the communication system 120 captures, by the camera sub-system 126, image data of the physical space 300 and, by the depth sensor sub-system 180, depth data describing objects of the physical space.

Based on the image and depth data, the communication system 120 identifies one or more flat surfaces in the physical space 300. For example, the communication system 120 identifies the writing surface 305 and the one or more additional flat surfaces 310. Based on the image and depth data, the communication system 120 determines that a surface of the identified flat surfaces meets criteria associated with a writing surface. As described in conjunction with FIG. 2, the criteria may include, for example, a dominant color of the flat surface, a shape of the flat surface, a size of the flat surface, and the like. As one example, the surface can satisfy the one or more criteria when it is predominantly white in color (or some other color defined by the predefined criteria). As another example (in addition to or separate from the previous example), the surface can satisfy the one or more criteria when it is rectangular in shape and less than 5 feet in length and height (or some other threshold size dimensions defined by the predefined criteria).

Responsive to a writing surface being identified, the communication system 120 captures the content 315 of the writing surface 305. For example, the communication system 120 captures image data by the camera sub-system 126 including the content of the writing surface. In an embodiment, the communication system 120 performs one or more processing operations on the captured image data. For example, the captured image data may be cropped to the dimensions of the identified writing surface 305. In another example, the captured image data may be converted to a text representation of written content on the writing surface 305. Written content 315A may include symbols corresponding to actions taken by the communication system 120. For example, as shown in FIG. 3A, written content including an "@" symbol may cause the communication system 120 to tag, email, message, or otherwise transmit a notification to a user of the communication system with a user identifier corresponding to a name following the "@" symbol (e.g., "@Toney," "@Ryan"). In another example, written content may include symbols causing the communication system 120 to format text or content on the writing surface 305 (e.g., "//DEADLINE: 9/23//" may cause the communication system to bold text written within the formatting symbols "II"). In other examples, other symbols may be used and may correspond to other actions performed by the communication system 120.

The communication system 120 performs any actions corresponding to content on the writing surface 305 and transmits the writing surface content to one or more remote client devices 115 participating in the communication session. In an embodiment, the transmitted writing surface content is image data captured by the camera sub-system 126 in real-time (e.g., video data of at least a portion of the writing surface) or near real-time (e.g., image data transmitted at time intervals). In another embodiment, the transmitted writing surface content is a text document corresponding to image data of the writing surface 305.

FIG. 3B is an example for detecting an occlusion impacting visibility of writing surface content and modifying image data responsive to the detection. During a communication session between the communication system 120 and one or more remote client devices 115, a writing surface 305 is detected and writing surface content is transmitted to the one or more remote client devices. The communication system 120 detects an object or person 320 impacting visibility of the writing surface 305. For example, the communication system 120 receives, from the depth sensor sub-system 180 based on a current image frame taken by the camera sub-system 126, depth data indicating an object 320 having a depth between the communication system and the identified writing surface 305 and being within the boundaries of the identified writing surface in the physical space 300.

In an embodiment, the communication system 120 may process the current image frame to render the occluding object 320 at least partially transparent. The communication system 120 accesses one or more stored prior image frames of the writing surface 305 captured before detecting the object 320 and identifies, from the one or more prior image frames, pixels corresponding to a region of the writing surface occluded by the object in the current image frame. In an example, the communication system 120 replaces the pixels in the current image frame corresponding to the occluding object 320 with pixels from the one or more prior image frames corresponding to the region of the writing surface 305 occluded by the object, such that the occluding object appears wholly transparent in the processed image frame. In another example, the communication system 120 blends the pixels in the current image frame corresponding to the occluding object 320 with pixels from the one or more prior image frames corresponding to the region of the writing surface 305 occluded by the object, such that the occluding object appears partially transparent in the processed image frame.

The communication system 120 transmits the processed image frame to the one or more remote client devices 115. This enables users of the remote client devices 115 to view writing surface content even when objects in the physical space 300 occlude the view of the writing surface from the view of the communication system 120.

Figure 4:
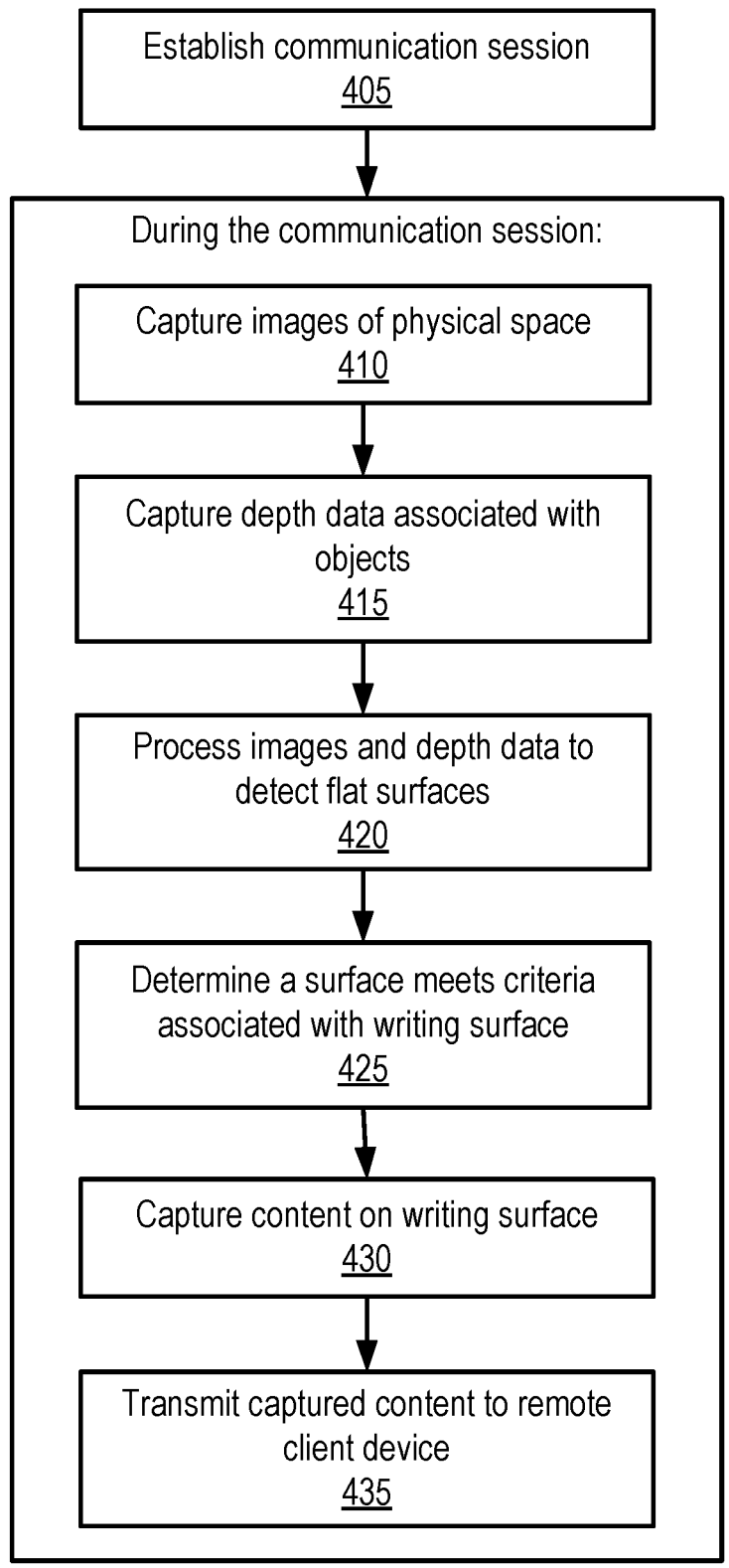
FIG. 4 is a flowchart illustrating an example method for capturing content on writing surfaces, in accordance with an embodiment.

FIG. 4 is a flowchart illustrating an example method for capturing content on writing surfaces, in accordance with an embodiment. The steps of FIG. 4 may be performed by the surface interaction module 158, though in other embodiments, some or all of the steps may be performed by other entities or systems. In addition, other embodiments may include different, additional, or fewer steps, and the steps may be performed in different orders.

A communication system 120 establishes 405 a communication session between the communication system and one or more remote client devices 115. During the communication session, the surface interaction module 158 captures 410 images of a physical space including the communication system 120, e.g., by a camera of the communication system. The surface interaction module 158 additionally captures 415 depth data associated with objects in the physical space of the communication system 120, e.g., by a depth sensor of the communication system. In some embodiments, the communication system may include multiple cameras and/or multiple depth sensors for capturing image or depth data. The surface interaction module 158 processes 420 the images and depth data to detect one or more flat surfaces within the physical space of the communication system.

The surface interaction module 158 determines 425 that a surface of the one or more flat surfaces meets predefined criteria associated with a writing. For example, a surface of the one or more flat surfaces is predominantly white meets a predefined criteria for a whiteboard. In another example (in addition to or separate from the previous example), a surface of the one or more flat surfaces is within a predefined size range, is a rectangular shape, or meets one or more other criteria for a writing surface. Responsive to the determination, the surface interaction module 158 captures 430 content on the writing surface and transmits 435 the captured content to at least one remote client device of the one or more remote client devices for display.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    establishing a communication session between a communication system and one or more remote client devices; and
    during the communication session:
        capturing, by a camera of the communication system, image data of a physical space;
        capturing, by a depth sensor of the communication system, depth data associated with objects in the physical space;
        processing the image data and the depth data to detect one or more flat surfaces within the physical space of the communication system;
        determining whether a respective surface of the one or more flat surfaces meets one or more predefined criteria;
        in response to determining that the respective surface of the one or more flat surfaces meets the one or more predefined criteria, capturing additional image data that includes content written on the respective surface;
        storing identifying information of a region of the physical space corresponding to the respective surface, the identifying information including a plane of the respective surface and boundaries of the plane;
        receiving, from the camera of the communication system, a current image frame;
        detecting, based on depth information from the depth sensor for the current image frame, an object within the boundaries of the plane and having a depth between the camera and the plane;
        processing the current image frame to render the object at least partially transparent; and
        transmitting the content to the one or more remote client devices for display.

2. The method of claim 1, wherein determining whether the respective surface meets the one or more predefined criteria comprises:
    evaluating image data to identify one or more features of the respective surface;
    comparing the one or more features of the respective surface to one or more predefined features of writing surfaces; and
    determining, based on the comparing, whether the one or more features of the respective surface substantially match the one or more predefined features of writing surfaces.

3. The method of claim 1, wherein processing the image frame to render the object at least partially transparent comprises:
    accessing one or more prior image frames that are captured before detecting the object;
    identifying, from the one or more prior image frames, pixels corresponding to a region of the respective surface occluded by the object in the current image frame; and
    replacing the pixels in the current image frame corresponding to the object with the pixels from the one or more prior image frames corresponding to the region of the respective surface occluded by the object.

4. The method of claim 1, wherein processing the image frame to render the object at least partially transparent comprises:
    accessing one or more prior image frames that are captured before detecting the object;

identifying, from the one or more prior image frames, pixels corresponding to a region of the respective surface occluded by the object in the current image frame; and blending the pixels in the current image frame corresponding to the object with the pixels from the one or more prior image frames corresponding to the region of the respective surface occluded by the object.

5. The method of claim 1, wherein transmitting the captured content further comprises:

generating a document including the captured content; and transmitting the generated document to the one or more remote client devices.

6. The method of claim 1, further comprising:

identifying a symbol in the captured content on the respective surface, the symbol corresponding to an action used to modify the captured content; and performing the action.

7. The method of claim 6, wherein the action is one or more of: bolding, highlighting, underlining, italicizing, or otherwise emphasizing at least a portion of the captured content.

8. The method of claim 6, wherein the action is one or more of: tagging or notifying a user or transmitting content to a user.

9. The method of claim 1, wherein the surface of interest is one of: a whiteboard, a blackboard, a canvas, a notepad, a notebook, and transparent or semi-transparent glass being used as a writable surface.

10. The method of claim 1, wherein transmitting the captured content comprises transmitting video data including at least a portion of the respective surface to the at least one remote client device.

11. A non-transitory computer-readable storage medium, storing one or more programs configured for execution by one or more processors of a communication device with a camera and a depth sensor, the one or more programs including instructions for:

establishing a communication session between the communication system and one or more remote client devices; and during the communication session:

capturing, by the camera of the communication system, image data of a physical space;

capturing, by the depth sensor of the communication system, depth data associated with objects in the physical space;

processing the image data and the depth data to detect one or more flat surfaces within the physical space of the communication system;

determining whether a respective surface of the one or more flat surfaces meets one or more predefined criteria;

in response to determining that the respective surface of the one or more flat surfaces meets the one or more predefined criteria, capturing additional image data that includes content written on the respective surface;

storing identifying information of a region of the physical space corresponding to the writing surface, the identifying information including a plane of the writing surface and boundaries of the plane;

receiving, from the camera of the communication system, a current image frame;

detecting, based on depth information from the depth sensor for the current image frame, an object within the boundaries of the plane and having a depth between the camera and the plane; and processing the current image frame to render the object at least partially transparent; and transmitting the content to the one or more remote client devices for display.

12. The computer-readable storage medium of claim 11, wherein determining that the surface meets the one or more predefined criteria comprises:

evaluating image data to identify one or more features of the respective surface;

comparing the one or more features of the respective surface to one or more predefined features of writing surfaces; and determining, based on the comparing, whether the one or more features of the respective surface substantially match the one or more predefined features of writing surfaces.

13. The computer-readable storage medium of claim 11, wherein processing the image frame to render the object at least partially transparent comprises:

accessing one or more prior image frames, the prior image frame captured before detecting the object;

identifying, from the one or more prior image frames, pixels corresponding to a region of the writing surface occluded by the object in the current image frame; and replacing the pixels in the current image frame corresponding to the object with the pixels from the one or more prior image frames corresponding to the region of the writing surface occluded by the object.

14. The computer-readable storage medium of claim 11, wherein processing the image frame to render the object at least partially transparent comprises:

accessing one or more prior image frames, the prior image frame captured before detecting the object;

identifying, from the one or more prior image frames, pixels corresponding to a region of the writing surface occluded by the object in the current image frame; and blending the pixels in the current image frame corresponding to the object with the pixels from the one or more prior image frames corresponding to the region of the writing surface occluded by the object.

15. The computer-readable storage medium of claim 11, wherein transmitting the captured content further comprises:

generating a document including the captured content; and transmitting the generated document to at least one remote client device.

16. The computer-readable storage medium of claim 11, wherein the one or more programs further include instructions for:

identifying a symbol in the captured content on the writing surface, the symbol corresponding to an action; and performing the action, the action modifying the transmitted captured content.

17. The computer-readable storage medium of claim 16, wherein the action is one or more of: bolding, highlighting, underlining, italicizing, or otherwise emphasizing at least a portion of the captured content.

18. The computer-readable storage medium of claim 16, wherein the action is one or more of: tagging or notifying a user or transmitting content to a user.

19. A communication system, comprising:

one or more cameras;

one or more depth sensors;

one or more processors; and a memory storing one or more programs configured to be executed by the one or more processors, the one or more programs including instructions for:

establishing a communication session between a communication system and one or more remote client devices; and during the communication session:

capturing, by a camera of the communication system, image data of a physical space;

capturing, by a depth sensor of the communication system, depth data associated with objects in the physical space;

processing the image data and the depth data to detect one or more flat surfaces within the physical space of the communication system;

determining whether a respective surface of the one or more flat surfaces meets one or more predefined criteria;

in response to determining that the respective surface of the one or more flat surfaces meets the one or more predefined criteria, capturing additional image data that includes content written on the respective surface;

storing identifying information of a region of the physical space corresponding to the writing surface, the identifying information including a plane of the writing surface and boundaries of the plane;

receiving, from the camera of the communication system, a current image frame;

detecting, based on depth information from the depth sensor for the current image frame, an object within the boundaries of the plane and having a depth between the camera and the plane; and processing the current image frame to render the object at least partially transparent; and transmitting the content to the one or more remote client devices for display.

* * * * *